W. H. PEACE.
BOX SHOOK MACHINE.
APPLICATION FILED NOV. 3, 1917.
1,296,424.
Patented Mar. 4, 1919.
5 SHEETS—SHEET 3.
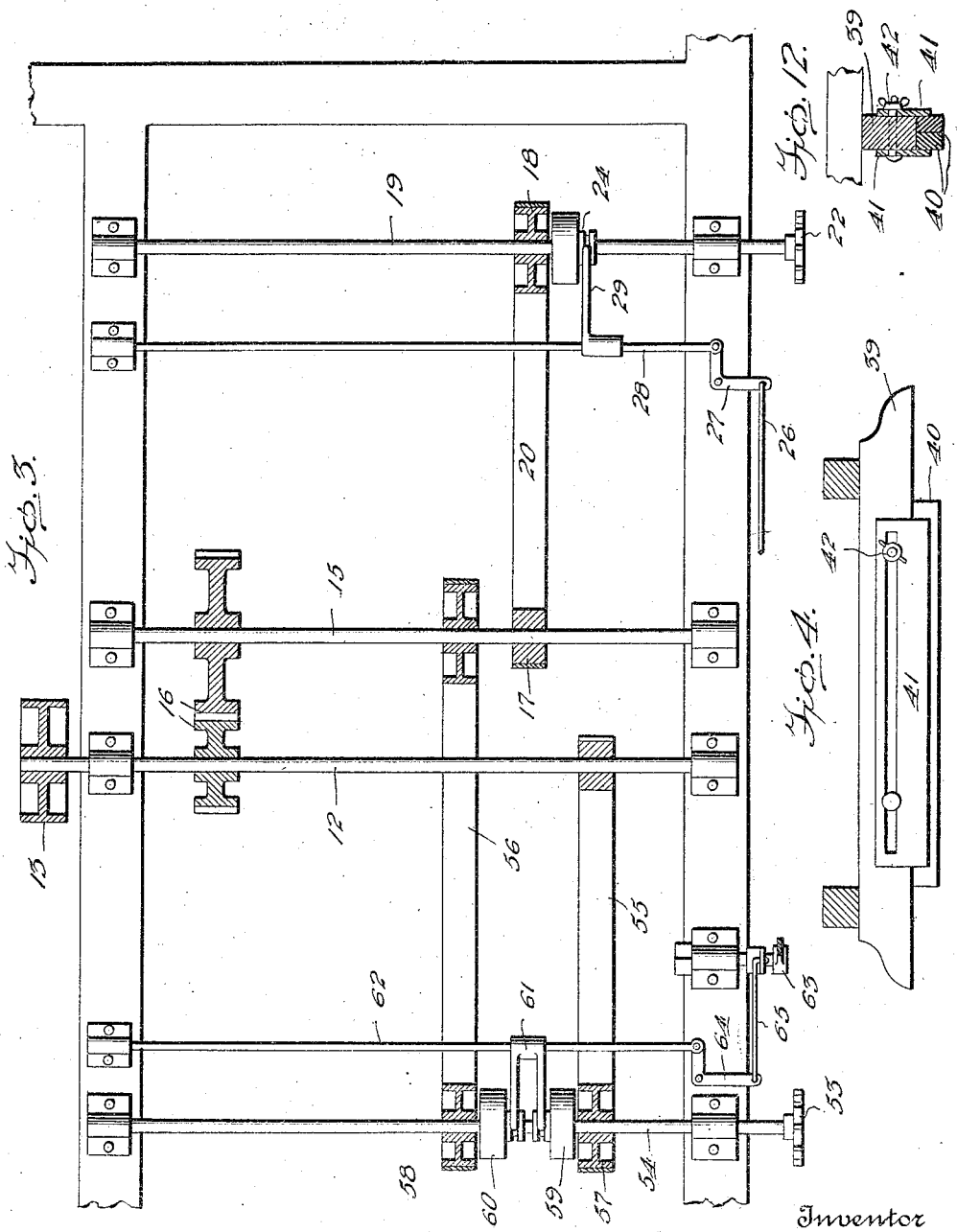
Witnesses
Paul M. Hunt
Inventor
Wm. H. Peace
By Victor J. Evans
Attorney

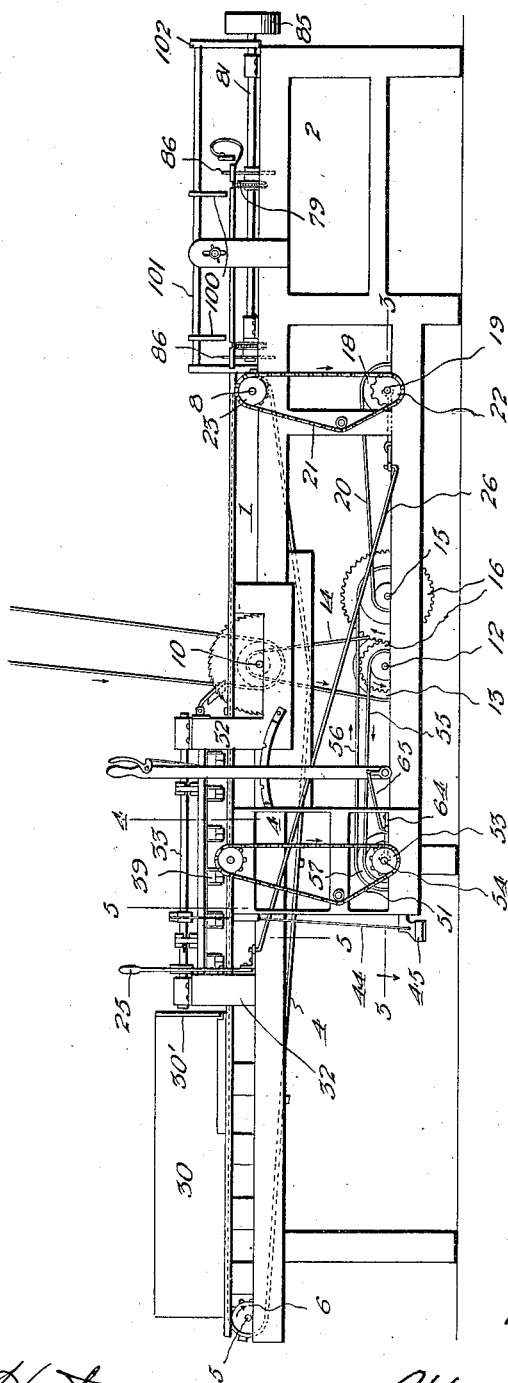

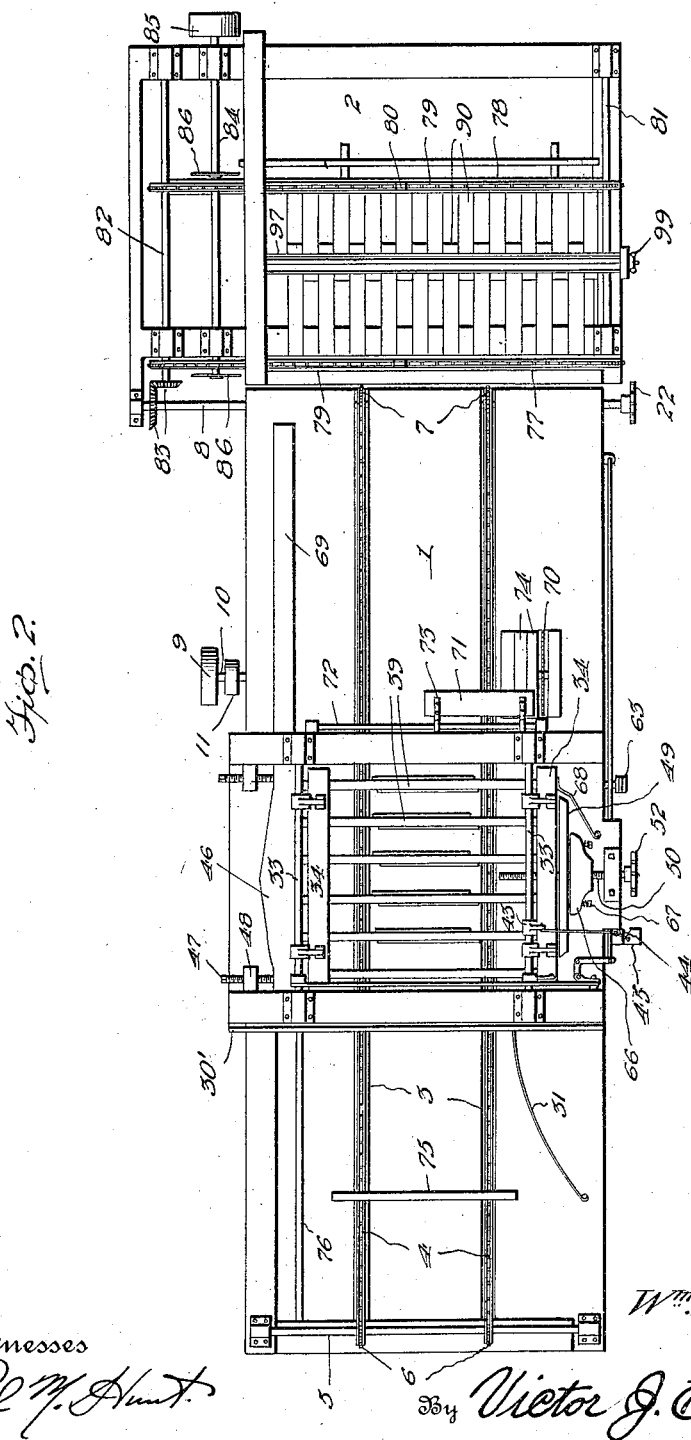

W. H. PEACE.
BOX SHOOK MACHINE.
APPLICATION FILED NOV. 3. 1917.

1,296,424.

Patented Mar. 4, 1919.
5 SHEETS—SHEET 4.

Inventor
Wm. H. Peace

Witnesses
Paul M. Hunt

By Victor J. Evans
Attorney

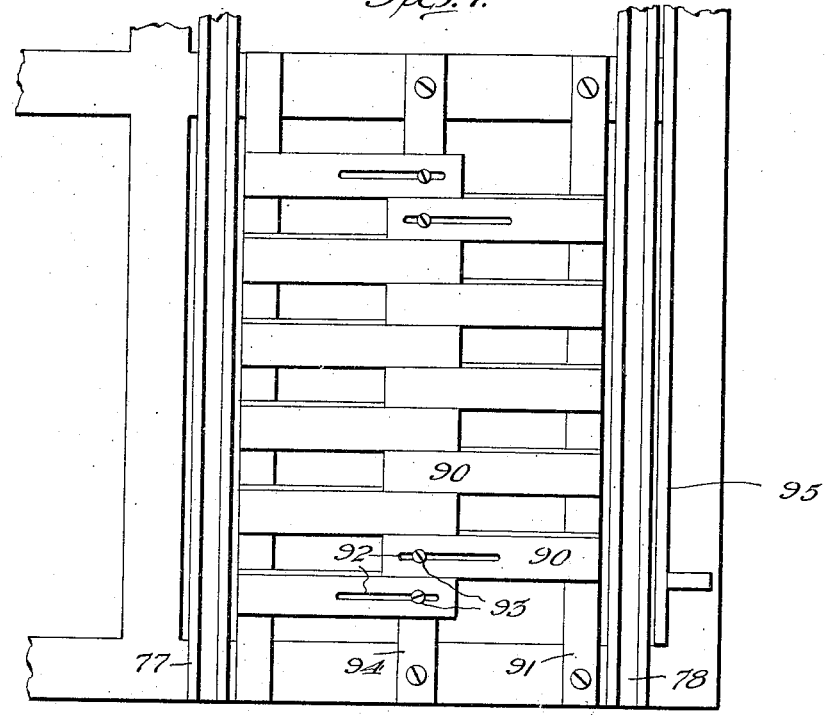
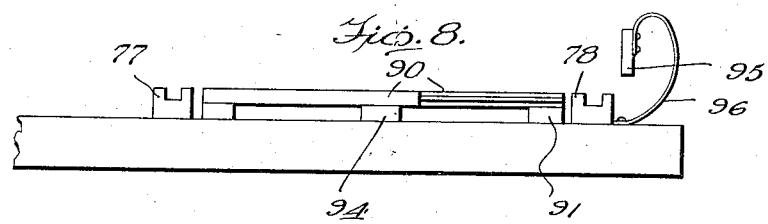
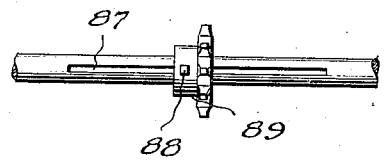

UNITED STATES PATENT OFFICE.

WILLIAM H. PEACE, OF THOMASVILLE, NORTH CAROLINA, ASSIGNOR OF ONE-HALF TO HUGHES PEACE LUMBER CO., OF THOMASVILLE, NORTH CAROLINA.

BOX-SHOOK MACHINE.

1,296,424.  Specification of Letters Patent.  Patented Mar. 4, 1919.

Application filed November 3, 1917. Serial No. 200,136.

*To all whom it may concern:*

Be it known that I, WILLIAM H. PEACE, a citizen of the United States, residing at Thomasville, in the county of Davidson and State of North Carolina, have invented new and useful Improvements in Box-Shook Machines, of which the following is a specification.

This invention relates to new and useful improvements in box making machines and the principal object of the invention is to provide means for forming box shooks from tongued and grooved boards cut to rough length and fed to the machine.

By my invention the boards are placed in the hopper and then by actuating suitable levers the boards are caused to be fed to a press where they are forced together with their tongues and grooves in engagement, after leaving the press the shooks are cut to proper width by a rip-saw and from this point they are carried to a pair of cross-cut-saws where they are cut to proper length.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side elevation of my machine.

Fig. 2 is a plan view.

Fig. 3 is a horizontal section on line 3—3 of Fig. 1.

Fig. 4 is a cross section on line 4—4 of Fig. 1.

Figs. 7 and 8 are detail views of the adjustable table feeding the shooks to the cross-cut-saws.

Fig. 9 is a detail view showing the means for adjusting the sprockets for the feeding chains.

Fig. 12 is a cross section through Fig. 4.

Figure 5:
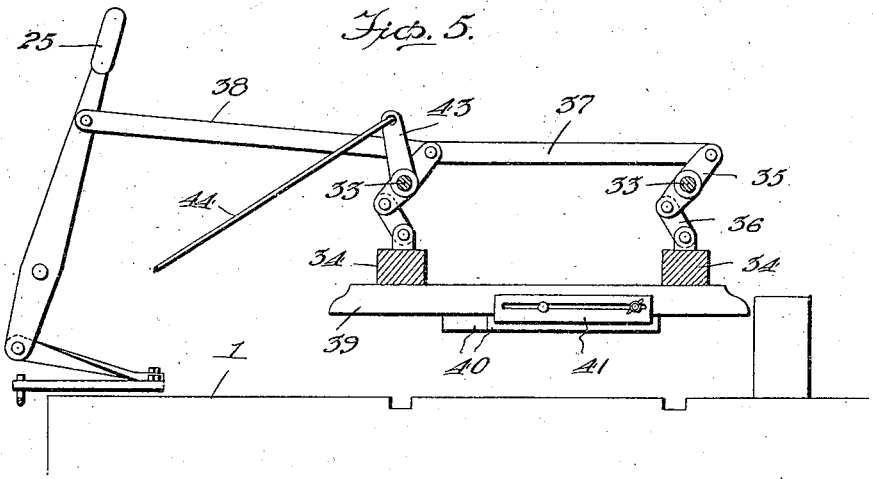
Fig. 5 is a cross section on line 5—5 of Fig. 1.
Figure 6:
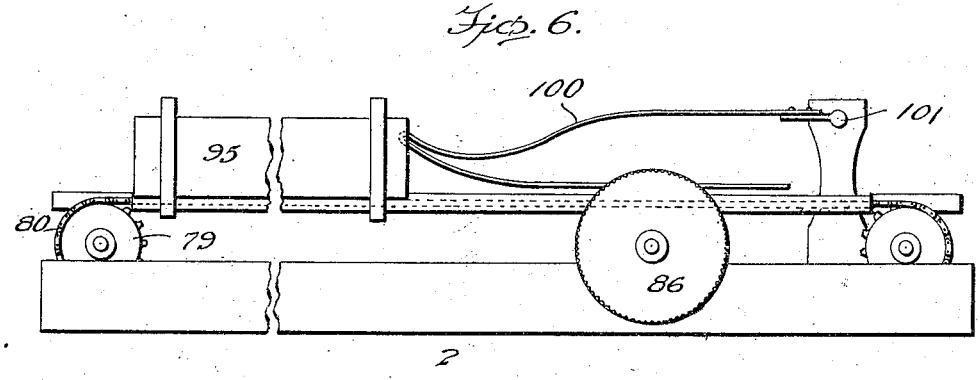
Fig. 6 is a partial view of the rear end.
Figure 11:
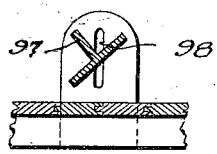
Figs. 10 and 11 are details of the adjustable guide.
Figure 10:
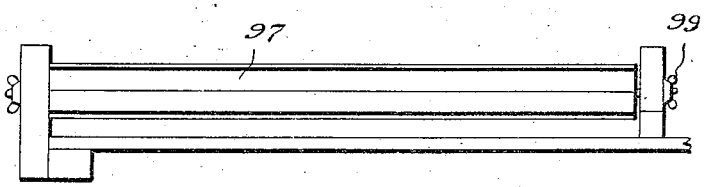

As shown in these figures the machine comprises a table 1 which is provided with a laterally extending extension 2, at its rear end. The surface of the table is provided with a pair of longitudinally extending grooves 3 through which the feed chains 4 pass. These chains are supported at the front end of the table by the shaft 5 provided with the sprockets 6 and at the other end of the table said chains pass over sprockets 7 carried by a shaft 8. The shaft 8 is driven from a suitable power pulley 9 located on a shaft 10 to which is secured a small pulley 11, power being transmitted from said pulley 11 to the shaft 8 by means of the lower shaft 12 provided with the pulley 13 which is connected with the pulley 11 by the belt 14 and the movement of the shaft 12 is transmitted to a shaft 15 by the gears 16 and a pulley 17 on the shaft 15 is connected to a pulley 18 on shaft 19 by a belt 20 and shaft 19 is connected with the shaft 8 by means of a belt 21 passing over the sprocket wheels 22 and 23 on said shaft. The motion to the shaft 19 is controlled by a clutch 24 on said shaft which is actuated by a lever 25 connected to the clutch by a rod 26, a bell crank 27, shaft 28 and link 29. At the front of the machine is located a hopper 30 to receive the boards for forming the shooks. The outlet of said hopper is controlled by an adjustable board 30′ and a spring 31 directs the boards to the said outlet. Adjacent said outlet is located a press which is composed of the uprights 32 on which are located the shafts 33. These shafts carry the movable press frame which consists of the beams 34 which are connected to the shaft by the links 35, secured to the shafts intermediate their ends, and which are connected to lugs on the beams by the pivoted links 36. The upper ends of these links are connected together by the bars 37 and these bars are connected with the lever 25 by the bars 38. The movable frame also includes a plurality of spaced bars 39 which have their ends secured to the beams 34 and these bars are provided with movable shoes 40 on the lower faces which are connected with the said bars by means of the slotted members 41 secured to each side of the bars by the thumb bolts 42. It will thus be seen that the shoes may be adjusted longitudinally on said bars. As will be seen the movable frame is located above the track of the chains and by means of the lever 25 said frame may be forced downward on to the table to grip the boards thereon and a further pressure may be placed on said frame by means of the lever 43 connected to one of the shafts 33 and having its other end connected by a cable 44 with a foot pedal 45. An adjustable stop 46 is secured to the table at one end of the press mechanism, said stop being adjustable by means of the screws 47 working in the nuts 48 and at the opposite end of said frame is located a movable presser bar 49 actuated by a screw 50 which is rotated in both directions by means of a chain 51 passing over the sprocket 52 on said screw and over a second sprocket 53 on shaft 54 which is connected with the shafts 12 and 15 by the belts 55 and 56 passing over suitable pulleys on the shafts and the pulleys 57 and 58 on the shaft 54. The pulleys 57 and 58 are provided with clutch means 59 and 60 which are actuated by the clutch finger 61 located on a shaft 62 and controlled by a lever 63 by means of the bell crank 64 and link 65. I prefer to provide a compensating block 66 for connecting the presser bar with the screw, this block carrying the spring controlled bolts 67 which engage with said bar. 68 represents a spring for holding the shook against the guide 69 as said shook passes from the press to the rip saw.

It will be seen that when the lever 25 is moved to throw in the clutch 24 to start the feed chains to move that the presser frame will be raised and the chains will move the lower layer of boards from the hopper under said frame and then the operator moves the lever 25 to stop the feed and at the same time lowers the presser frame on to the boards. He then presses the foot lever 45 to further grip the boards and at the same time moves the lever 63 to throw in the clutch 59 to cause the screw 50 to feed the presser bar against the boards to force their tongues and grooves into engagement, the stop 46 supporting the other side of the boards. After this operation is completed the operator moves the lever 63 in an opposite direction so as to throw the clutch 59 out of action and to throw the clutch 60 into engagement with the pulley 58. Thus the screw is moved in an opposite direction to withdraw the presser block and then the operator moves the lever 25 thus raising the presser frame and beginning the feeding action again. This feeding action will take the formed shook from the presser frame and insert a new set of boards thereto; as the formed shook leaves the press frame one side is kept in alinement by the guide 69 and the other side comes into engagement with a rip-saw 70 located on the shaft 10 so that the shook is cut to the proper width. In this sawing action the shook is held in proper position by the guide 71 pivotally and adjustably secured to the shaft 72 by the straps 73. The saw 70 is adjustably mounted on the shaft in any suitable manner and the table is provided with removable portions 74 so that said saw may be adjusted. I connect the two chains together at intervals by feeding strips 75 and I locate a guide 76 in the hopper which serves the same purpose as the guide 69.

On the extension 2 I locate a pair of track members 77 and 78 which extend at right angles to the tracks on the main table and these track members are adapted to receive the feed chains 79 provided with feed lugs 80 and passing over sprocket wheels located on the shafts 81 and 82 located at the ends of the table 2. The shaft 82 is driven from the shaft 8 by means of the gears 83. A shaft 84 is carried by the table 2, said shaft being rotated from any suitable means by the pulley 85 and this shaft carries a pair of cross-cut-saws 86 one of which is adjustably mounted on said shaft so as to adjust the space between the saws, and the sprocket wheels, for the rearmost feed chain 79, are also adjustably mounted on the shafts by means of a slot 87 in each shaft which receives the end of a bolt 88 carried by a sleeve 89 secured to the sprocket wheel. The track 78 is also adjustable toward and from the track 77 by means of a series of tongued and grooved strips 90 forming a table between the tracks, one set of strips having their ends connected with an adjustable bar 91 and the other ends in sliding contact with the other strips, and some of said strips having slots 92 therein engaging with bolts 93 carried by an adjustable bar 94. The track 78 carries a buffer 95 which is supported by a spring 96, and located above the table formed by the strips 90 is a guiding bar 97 preferably of T-shape in cross section and having its ends adjustably mounted in slots 98 formed in a part of the table, said guide bar being adjusted in the slots by means of the thumb nuts 99. Adjacent the cross-cut-saws is located a pair of steadying springs 100 which are adjustably carried on a bar 101 mounted in uprights 102 on the frame.

It will thus be seen that as the shook reaches the end of the table 1 it is delivered to the feeding table 2 and the feeding chains on this table cause the shook to move at right angles to its line of movement on table 1 and said chains carry the shook to the cross-cut-saws where its ends are cut and thus a shook of the proper width and length is produced. The guiding bar 97 is held in an inclined position so as to direct the end of the shook on the feeding table as the end of the shook travels over the strips 90. The buffer 95 prevents the shook from moving too far on the table. The springs 100 engage and steady the shook as the same is being engaged by the cross-cut-saws.

It will be seen that by my machine the box shooks may be formed from tongue and grooved boards and that said shooks may be made of any desired size.

When the shooks are made up of boards of three-fourths inch or greater thickness, only one shook is fed through the machine at a time but if they are five-eighths inch or less I prefer to form them of one board in thickness, double tongued and grooved, then split said board in half to form two shooks of the proper thickness and then the two halves are kept together and are fed through the machine two at a time.

It is thought from the foregoing description that the advantages and novel features of my invention will be readily apparent.

I desire it to be understood that I may make slight changes in the construction and in the combination and arrangement of the several parts, provided that such changes fall within the scope of the appended claims.

What I claim is:—

1. A machine of the class described comprising a hopper, a press, feeding means, means for opening the press and actuating the feeding means to pass the boards from the hopper to the press and for stopping the feed and closing the press, a single operating lever for actuating said means, means for subjecting the boards to side-wise pressure while held in the press, means in the path of the feeding means for cutting the assembled boards to the proper width, and means for cutting said boards to the proper length.

2. A box shook forming machine comprising a press consisting of a plurality of bars spaced apart, adjustable shoes on each of said bars, means for raising and lowering said press, and means actuated by a foot pedal for increasing the pressure action thereof after the same has been lowered.

3. A box shook forming machine comprising a hopper, a press located adjacent the hopper, a rip-saw located adjacent the press, feeding means for carrying the boards from the hopper through the press and by the rip-saw, a power shaft connected with said means and with the saw, means for raising and lowering the press, a hand lever for simultaneously raising the press and connecting the power shaft with the feeding means and for disconnecting the power shaft from the feeding means and lowering the press, means for pressing the edges of the boards together while held in the press, clutch means for connecting said means with the power shaft, a shaft connected with the power shaft, a second clutch means connecting said shaft with the pressing means to release the pressure, a single lever for controlling said clutch means, a pair of cross cut saws, means for feeding the shooks thereto from the first mentioned means, and means for driving said saws and the second feeding means from the power shaft.

4. A box shook forming machine comprising a press, a normally stationary member forming the rear part of the press, means for adjusting said member, a presser bar, a block, a screw engaging with said block, spring means for connecting said block and presser bar together, and means for rotating said screw.

5. A box shook forming machine comprising a table, feeding means for feeding a shook to said table, said feeding means being at right angles to the table, an inclined guide bar located above the table for directing the shook on said table, means for adjusting the height of the bar from the table and also its inclination, and feeding means on the table.

In testimony whereof I affix my signature.

WILLIAM H. PEACE.

Copies of this patent may be obtained for five cents each, by addressing the "Commissioner of Patents, Washington, D. C."